(12) United States Patent
Cabell et al.

(10) Patent No.: US 7,754,119 B2
(45) Date of Patent: *Jul. 13, 2010

(54) METHOD FOR MAKING POLYMERIC STRUCTURES

(75) Inventors: David William Cabell, Cincinnati, OH (US); David Warren Loebker, Cincinnati, OH (US); Larry Neil Mackey, Fairfield, OH (US); Gregory Charles Gordon, Cincinnati, OH (US); Mark Ryan Richards, Hamilton, OH (US); Fred J. Keck, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 945 days.

This patent is subject to a terminal disclaimer.

(21) Appl. No.: 11/167,356

(22) Filed: Jun. 27, 2005

(65) Prior Publication Data
US 2005/0275133 A1 Dec. 15, 2005

Related U.S. Application Data

(62) Division of application No. 10/834,540, filed on Apr. 29, 2004, now Pat. No. 6,977,116.

(51) Int. Cl.
*D01D 5/08* (2006.01)
*D02J 1/00* (2006.01)
(52) U.S. Cl. .................. 264/103; 264/211.12; 264/236
(58) Field of Classification Search ............... 264/103, 264/205, 207, 211.12, 236
See application file for complete search history.

(56) References Cited

U.S. PATENT DOCUMENTS

| 1,856,401 | A | 5/1932 | Prince |
| 1,885,256 | A | 11/1932 | Gull |
| 2,169,250 | A | 8/1939 | Izard |
| 2,570,449 | A | 10/1951 | Horsak |
| 2,902,336 | A | 9/1959 | Hiemstra et al. |
| 3,117,014 | A | 1/1964 | Klug |
| 3,137,592 | A | 6/1964 | Protzman et al. |
| 3,220,991 | A | 11/1965 | Martins |
| 3,280,229 | A | 10/1966 | Simons |
| 3,379,811 | A | 4/1968 | Hartmann et al. |
| 3,499,074 | A | 3/1970 | Barger et al. |
| 3,691,730 | A | 9/1972 | Hickey et al. |
| 3,954,361 | A | 5/1976 | Page |

(Continued)

FOREIGN PATENT DOCUMENTS

DE 4339381 5/1995

(Continued)

OTHER PUBLICATIONS

A.J.F. de Carvalho, A.A.S. Curvelo, J.A.M. Agnelli, A First Insight on Composites of Thermoplastic Starch and Kaolin, Carbohydrate Polymers 45 (2001) 189-194, received Sep. 23, 1999; revised Jan. 26, 2000, 2001 Elsevier Science Ltd.

(Continued)

*Primary Examiner*—Leo B Tentoni
(74) *Attorney, Agent, or Firm*—C. Brant Cook

(57) ABSTRACT

Polymeric structures, methods for making same, fibrous structures comprising same and fibrous product incorporating same are provided.

6 Claims, 2 Drawing Sheets

U.S. PATENT DOCUMENTS

| | | |
|---|---|---|
| 4,069,177 A | 1/1978 | Smith |
| 4,076,663 A | 2/1978 | Masuda et al. |
| 4,115,332 A | 9/1978 | Young et al. |
| 4,117,222 A | 9/1978 | Holst et al. |
| 4,139,699 A | 2/1979 | Hernandez et al. |
| 4,243,480 A | 1/1981 | Hernandez et al. |
| 4,340,563 A | 7/1982 | Appel et al. |
| 4,380,570 A | 4/1983 | Schwarz |
| 4,577,031 A | 3/1986 | Iovine et al. |
| 4,596,850 A | 6/1986 | Iovine et al. |
| 4,622,374 A | 11/1986 | Iovine et al. |
| 4,627,811 A | 12/1986 | Greiser et al. |
| 4,673,438 A | 6/1987 | Wittwer et al. |
| 4,711,669 A | 12/1987 | Paul et al. |
| 4,818,463 A | 4/1989 | Buehning |
| 4,826,415 A | 5/1989 | Mende |
| 4,853,168 A | 8/1989 | Eden et al. |
| 4,855,179 A | 8/1989 | Bourland et al. |
| 4,900,361 A | 2/1990 | Sachetto et al. |
| 4,985,082 A | 1/1991 | Whistler |
| 5,079,354 A | 1/1992 | Gross et al. |
| 5,095,054 A | 3/1992 | Lay et al. |
| 5,122,048 A | 6/1992 | Deeds |
| 5,234,977 A | 8/1993 | Bastioli et al. |
| 5,258,430 A | 11/1993 | Bastioli et al. |
| 5,262,458 A | 11/1993 | Bastioli et al. |
| 5,275,774 A | 1/1994 | Bahr et al. |
| 5,277,761 A | 1/1994 | Van Phan et al. |
| 5,280,055 A | 1/1994 | Tomka |
| 5,286,770 A | 2/1994 | Bastioli et al. |
| 5,288,765 A | 2/1994 | Bastioli et al. |
| 5,292,782 A | 3/1994 | Bastioli et al. |
| 5,314,934 A | 5/1994 | Tomka |
| 5,316,578 A | 5/1994 | Buehler et al. |
| 5,342,335 A | 8/1994 | Rhim |
| 5,346,936 A | 9/1994 | Buehler et al. |
| 5,362,777 A | 11/1994 | Tomka |
| 5,368,690 A | 11/1994 | Solarek et al. |
| 5,382,611 A | 1/1995 | Stepto et al. |
| 5,405,564 A | 4/1995 | Stepto et al. |
| 5,412,005 A | 5/1995 | Bastioli et al. |
| 5,420,180 A | 5/1995 | Katayama et al. |
| 5,425,987 A | 6/1995 | Shawver et al. |
| 5,427,614 A | 6/1995 | Wittwer et al. |
| 5,436,078 A | 7/1995 | Buhler et al. |
| 5,444,107 A | 8/1995 | Ajioka et al. |
| 5,444,113 A | 8/1995 | Sinclair et al. |
| 5,445,785 A | 8/1995 | Rhim |
| 5,446,140 A | 8/1995 | Maheras et al. |
| 5,462,982 A | 10/1995 | Bastioli et al. |
| 5,476,616 A | 12/1995 | Schwarz |
| 5,480,923 A | 1/1996 | Schmid et al. |
| 5,491,180 A | 2/1996 | Kiuchi et al. |
| 5,516,815 A | 5/1996 | Buehler et al. |
| 5,523,339 A | 6/1996 | Solarek et al. |
| 5,569,692 A | 10/1996 | Bastioli et al. |
| 5,576,049 A | 11/1996 | Haas et al. |
| 5,616,631 A | 4/1997 | Kiuchi et al. |
| 5,679,145 A | 10/1997 | Andersen et al. |
| 5,693,279 A | 12/1997 | Feuer et al. |
| 5,703,160 A | 12/1997 | Dehennau et al. |
| 5,705,536 A | 1/1998 | Tomka |
| 5,720,832 A | 2/1998 | Minto et al. |
| 5,736,586 A | 4/1998 | Bastioli et al. |
| 5,747,125 A | 5/1998 | Markulin |
| 5,773,495 A | 6/1998 | Haschke et al. |
| 5,844,023 A | 12/1998 | Tomka |
| 5,866,251 A | 2/1999 | Bastioli et al. |
| 5,874,486 A | 2/1999 | Bastioli et al. |
| 5,922,379 A | 7/1999 | Wang |
| 5,945,480 A | 8/1999 | Wang et al. |
| 5,998,511 A | 12/1999 | Westland et al. |
| 6,013,223 A | 1/2000 | Schwarz |
| 6,045,908 A | 4/2000 | Nakajima et al. |
| 6,096,809 A | 8/2000 | Lorcks et al. |
| 6,117,925 A | 9/2000 | Tomka |
| 6,214,907 B1 | 4/2001 | Tomka |
| 6,218,321 B1 | 4/2001 | Lorcks et al. |
| 6,218,532 B1 | 4/2001 | Mark et al. |
| 6,231,970 B1 | 5/2001 | Andersen et al. |
| 6,235,815 B1 | 5/2001 | Loercks et al. |
| 6,235,816 B1 | 5/2001 | Lorcks et al. |
| 6,235,835 B1 | 5/2001 | Niessner et al. |
| 6,238,520 B1 | 5/2001 | Greenwood |
| 6,242,102 B1 | 6/2001 | Tomka |
| 6,277,899 B1 | 8/2001 | Bastioli et al. |
| 6,302,997 B1 | 10/2001 | Hurter et al. |
| 6,303,000 B1 | 10/2001 | Floyd et al. |
| 6,307,058 B1 | 10/2001 | Singh et al. |
| 6,348,524 B2 | 2/2002 | Bastioli et al. |
| 6,365,002 B1 | 4/2002 | Bindzus et al. |
| 6,365,079 B1 | 4/2002 | Winkler et al. |
| 6,372,361 B1 | 4/2002 | Mackewicz et al. |
| 6,469,130 B1 | 10/2002 | Qin et al. |
| 6,472,497 B2 | 10/2002 | Loercks et al. |
| 6,491,727 B1 | 12/2002 | Rearick et al. |
| 6,506,824 B1 | 1/2003 | Bastioli et al. |
| 6,517,678 B1 | 2/2003 | Shannon et al. |
| 6,620,503 B2 | 9/2003 | Qin et al. |
| 6,630,054 B1 | 10/2003 | Graef et al. |
| 6,649,665 B2 | 11/2003 | Kadonaga et al. |
| 6,689,378 B1 | 2/2004 | Sun et al. |
| 6,709,526 B1 | 3/2004 | Bailey et al. |
| 6,723,160 B2 | 4/2004 | Mackey et al. |
| 6,755,915 B1 | 6/2004 | Van Soest et al. |
| 6,802,895 B2 | 10/2004 | Mackey et al. |
| 6,809,158 B2 | 10/2004 | Ikeuchi et al. |
| 6,811,740 B2 | 11/2004 | James et al. |
| 6,843,888 B2 | 1/2005 | Merrette et al. |
| 6,861,520 B1 | 3/2005 | Todd et al. |
| 6,955,850 B1 | 10/2005 | Cabell et al. |
| 6,977,116 B2 | 12/2005 | Cabell et al. |
| 7,041,369 B1 | 5/2006 | Mackey et al. |
| 7,276,201 B2 | 10/2007 | James et al. |
| 7,426,775 B2 | 9/2008 | Forshey et al. |
| 2002/0015854 A1 | 2/2002 | Billmers et al. |
| 2002/0072471 A1 | 6/2002 | Ikeuchi et al. |
| 2003/0022581 A1 | 1/2003 | Tsai et al. |
| 2003/0072731 A1 | 4/2003 | Gulian et al. |
| 2003/0099692 A1 | 5/2003 | Lydzinski et al. |
| 2003/0146537 A1 | 8/2003 | James et al. |
| 2003/0201579 A1 | 10/2003 | Gordon et al. |
| 2003/0203196 A1 | 10/2003 | Trokhan et al. |
| 2004/0132873 A1 | 7/2004 | Bailey et al. |
| 2004/0152857 A1 | 8/2004 | Ohnishi et al. |
| 2004/0249066 A1 | 12/2004 | Heinzman et al. |
| 2005/0076809 A1 | 4/2005 | Mackey et al. |
| 2005/0136253 A1 | 6/2005 | Michael et al. |
| 2005/0137330 A1 | 6/2005 | Forshey et al. |
| 2005/0137331 A1 | 6/2005 | Forshey et al. |
| 2005/0263938 A1 | 12/2005 | Cabell et al. |
| 2005/0279470 A1 | 12/2005 | Redd et al. |
| 2005/0281978 A1 | 12/2005 | Cabell |

FOREIGN PATENT DOCUMENTS

| | | |
|---|---|---|
| EP | 0 108 364 B1 | 8/1986 |
| EP | 0 232 121 | 8/1987 |
| EP | 0 080 382 B1 | 8/1988 |
| EP | 0 124 713 B1 | 9/1988 |
| EP | 0 327 505 B2 | 8/1989 |
| EP | 0 345 566 A1 | 12/1989 |
| EP | 0 408 501 A2 | 1/1991 |
| EP | 0 522 358 A2 | 1/1993 |

| | | |
|---|---|---|
| EP | 0 541 050 A2 | 5/1993 |
| EP | 1 035 163 A2 | 1/1994 |
| EP | 0 143 175 B2 | 4/1996 |
| EP | 0 437 589 B1 | 7/1996 |
| EP | 0 576 553 B1 | 10/1996 |
| EP | 0 629 672 B1 | 11/1997 |
| EP | 1 035 163 A2 | 9/2000 |
| EP | 1 035 239 A2 | 9/2000 |
| EP | 1 103 655 A1 | 5/2001 |
| EP | 0 722 980 B1 | 11/2001 |
| EP | 1 199 327 A2 | 4/2002 |
| EP | 1 317 916 A2 | 6/2003 |
| EP | 0 865 841 B1 | 9/2003 |
| EP | 1 217 106 B1 | 11/2005 |
| GB | 1 247 474 | 9/1971 |
| GB | 1 422 185 | 1/1976 |
| JP | 61040341 | 2/1986 |
| JP | 62028410 | 2/1987 |
| JP | 2030581 A2 | 1/1990 |
| JP | 03-249208 | 11/1991 |
| JP | 04-100913 | 4/1992 |
| JP | 4100913 | 4/1992 |
| JP | 04-146217 | 5/1992 |
| JP | 4146217 | 5/1992 |
| JP | 06-212594 | 8/1994 |
| JP | 6212594 | 8/1994 |
| JP | 06-269239 | 9/1994 |
| JP | 07-197002 A1 | 8/1995 |
| JP | 08-027627 | 1/1996 |
| JP | 8027627 | 1/1996 |
| JP | 08-260250 | 10/1996 |
| JP | 8260250 | 10/1996 |
| JP | 09-041224 | 2/1997 |
| JP | 9041224 | 2/1997 |
| JP | 9276331 | 10/1997 |
| JP | 10008364 | 1/1998 |
| JP | 11-200529 | 7/1999 |
| JP | 2000-015389 A2 | 1/2000 |
| JP | 2004-107479 A2 | 4/2004 |
| WO | WO 90/14938 | 12/1990 |
| WO | WO 98/40434 | 9/1998 |
| WO | WO 00/29662 | 5/2000 |
| WO | WO 00/43423 | 7/2000 |
| WO | WO 01/38635 | 5/2001 |
| WO | WO 01/49912 A1 | 7/2001 |
| WO | WO 03/066942 A1 | 8/2003 |
| WO | WO 2004/007615 A1 | 1/2004 |
| WO | WO 2004/074367 A1 | 9/2004 |
| WO | WO 2005/052256 A2 | 6/2005 |

OTHER PUBLICATIONS

W. John G. McCulloch, Ph.D., The History of the Development of Melt Blowing Technology, Inj Spring 1999, pp. 66-72.

Author Unknown, A New Crop of Nonwovens, Nonwovens Industry, Feb. 2000, p. 58.

Susan Warren, Cargill, Dow Chemical to Make 'Natural Plastic', Wall Street Journal, Jan. 11, 2000.

Susanna Schiemer, Biodegradable Cellulose Fiber, Nonwovens World, Oct.-Nov. 1999, pp. 71-74.

H. Dale Wilson, Novel Polypropylene Resins for Nonwovens, Nonwovens World Oct.-Nov. 1999, p. 76.

Jan H. Schut, The New Look in Plastic—It's Paper!, Plastics Technology, Feb. 2000, pp. 52-57.

Josef L. Kokin, Lih-Shiuh Lai, Lisa L. Chedid, Effect of Starch Structure on Starch Rheological Properties, Food Technology, Jun. 1992, pp. 130-138.

Ralph D. Waniska and Marta H. Gomez, Dispersion Behavior of Starch, source unknown.

D.H. Muller, A. Krobjilowski, Meltblown Fabrics From Biodegradable Polymers, International Nonwovens Journal (Mar. 2001); abstract only.

S. Simmons et al., Thermoplastic Processing of Starch: Melt-Spinning of Starch-Based Fibers, Biodegradable Polymer Packaging (1993), Conference Proceedings, Publisher: Technomic, Lancaster, PA, pp. 171-207.

PCT International Search Report mailed Oct. 14, 2005.

Gimenez, V., et al., Crosslinking of Poly(Vinyl Alcohol) Using Dianhydrides as Hardeners, Journal of Applied Polymer Science, John Wiley and Sons Inc. New York, US, vol. 59, No. 3, Jan. 18, 1996, pp. 425-431.

Loisel, Catherine, et al., Rheology and Structure of Cross-Linked Starch Dispersions, Zywnosc 9(4 Suppl): 169-180 (2002).

Rhim, Ji-Won, et al., Modification of Poly(Vinyl Alcohol) Membranes Using Sulfur-Succinic Acid and Its Application to Pervaporation Separation of Water-Alcohol Mixtures, Journal of Applied Polymer Science, John Wiley and Sons Inc. New York, US, vol. 68, 1998, pp. 1717-1723.

U.S. Appl. No. 10/858,720, filed Jun. 2, 2004, Office Action dated Dec. 2, 2008 and Amendment submitted Dec. 23, 2008.

U.S. Appl. No. 11/167,356, filed Jun. 27, 2005, Office Action dated Oct. 27, 2008 and Amendment submitted Jan. 21, 2009.

U.S. Appl. No. 11/167,357, filed Jun. 27, 2005, Office Action dated Oct. 27, 2008 and Amendment submitted Jan. 21, 2009.

METHOD FOR MAKING POLYMERIC STRUCTURES

CROSS REFERENCE TO RELATED APPLICATIONS

This application is a divisional application of U.S. application Ser. No. 10/834,540, filed Apr. 29, 2004, now U.S. Pat. No. 6,977,116, issued Dec. 20, 2005.

FIELD OF THE INVENTION

The present invention relates to polymeric structures comprising a PVOH processed hydroxyl polymer composition comprising a hydroxyl polymer comprising at least a polyvinyl alcohol (PVOH) hydroxyl polymer, fibrous structures comprising such polymeric structures and methods for making same.

BACKGROUND OF THE INVENTION

In recent years, formulators of fibrous structures have attempted to move away from wood-based cellulosic fibers to polymeric fibers. Polymeric fiber-containing fibrous structures are known in the art. See for example, EP 1 217 106 A1.

However, such prior art attempts to make polymeric fiber-containing fibrous structures have failed to achieve the intensive properties of their wood-based cellulosic fiber-containing fibrous structure cousins.

Accordingly, there is a need for a polymeric structure and/or a fibrous structure comprising a polymeric structure in fiber form that exhibits intensive properties substantially similar to or better than wood-based cellulosic fiber-containing fibrous structures.

SUMMARY OF THE INVENTION

The present invention fulfills the need described above by providing a polymeric structure and/or a fibrous structure comprising a polymeric structure in fiber form that exhibits substantially similar or better intensive properties as compared to wood-based cellulosic fiber-containing fibrous structures.

In one aspect of the present invention, a polymeric structure comprising a PVOH processed hydroxyl polymer composition comprising a hydroxyl polymer comprising at least a PVOH hydroxyl polymer, wherein the polymeric structure exhibits a stretch at peak load of at least about 5% and/or at least about 8% and/or at least about 10% and/or a stretch at failure load of at least about 10% and/or at least about 13% and/or at least about 20%, is provided.

In another aspect of the present invention, a fibrous structure comprising a polymeric structure in the form of a fiber in accordance with the present invention, wherein the fibrous structure exhibits a stretch at peak load of at least about 5% and/or at least about 8% and/or at least about 10% and/or a stretch at failure load of at least about 10% and/or at least about 13% and/or at least about 20%, is provided.

In even another aspect of the present invention, a fibrous product comprising one or more fibrous structures in accordance with the present invention is provided.

In still another aspect of the present invention, a method for making a polymeric structure, the method comprising the steps of:
  a. providing a PVOH polymer melt composition comprising a hydroxyl polymer comprising at least a PVOH hydroxyl polymer; and
  b. polymer processing the PVOH polymer melt composition to form a polymeric structure;
  wherein the polymeric structure exhibits a stretch at peak load of at least about 5% and/or at least about 8% and/or at least about 10% and/or a stretch at failure load of at least about 10% and/or at least about 13% and/or at least about 20%, is provided.

In yet another aspect of the present invention, a polymeric structure in fiber form produced in accordance with a method of the present invention, is provided.

In even still another aspect of the present invention, a method for making a fibrous structure, the method comprising the steps of:
  a. providing a PVOH polymer melt composition comprising a hydroxyl polymer comprising at least a PVOH hydroxyl polymer;
  b. polymer processing the PVOH polymer melt composition to form a polymeric structure in fiber form; and
  c. incorporating the polymeric structure in fiber form into a fibrous structure;
  wherein the fibrous structure exhibits a stretch at peak load of at least about 5% and/or at least about 8% and/or at least about 10% and/or a stretch at failure load of at least about 10% and/or at least about 13% and/or at least about 20%, is provided.

In even yet another aspect of the present invention, a fibrous structure comprising two or more fibers at least one of which comprises a polymeric structure in fiber form, wherein the fibrous structure comprises a first region comprising associated fibers and a second region comprising non-associated fibers, is provided.

In still yet another aspect of the present invention, a fibrous product comprising one or more fibrous structures comprising a first region comprising associated fibers and a second region comprising non-associated fibers, is provided.

In even still yet another aspect of the present invention, a method for making a fibrous structure, the method comprising the steps of:
  a. providing a fibrous structure comprising two or more fibers at least one of which comprises a polymeric structure in fiber form; and
  b. associating the two or more fibers with each other such that a fibrous structure comprising a first region comprising associated fibers and a second region comprising non-associated fibers is formed, is provided.

Accordingly, the present invention provides a polymeric structure, a fibrous structure comprising such a polymeric structure in fiber form, a fibrous product comprising one or more such fibrous structures, method for making such a polymeric structure, method for making such a fibrous structure comprising a polymeric structure in fiber form and a polymeric structure in fiber form produced by such a method.

DETAILED DESCRIPTION OF THE INVENTION

Definitions

Figure 1:
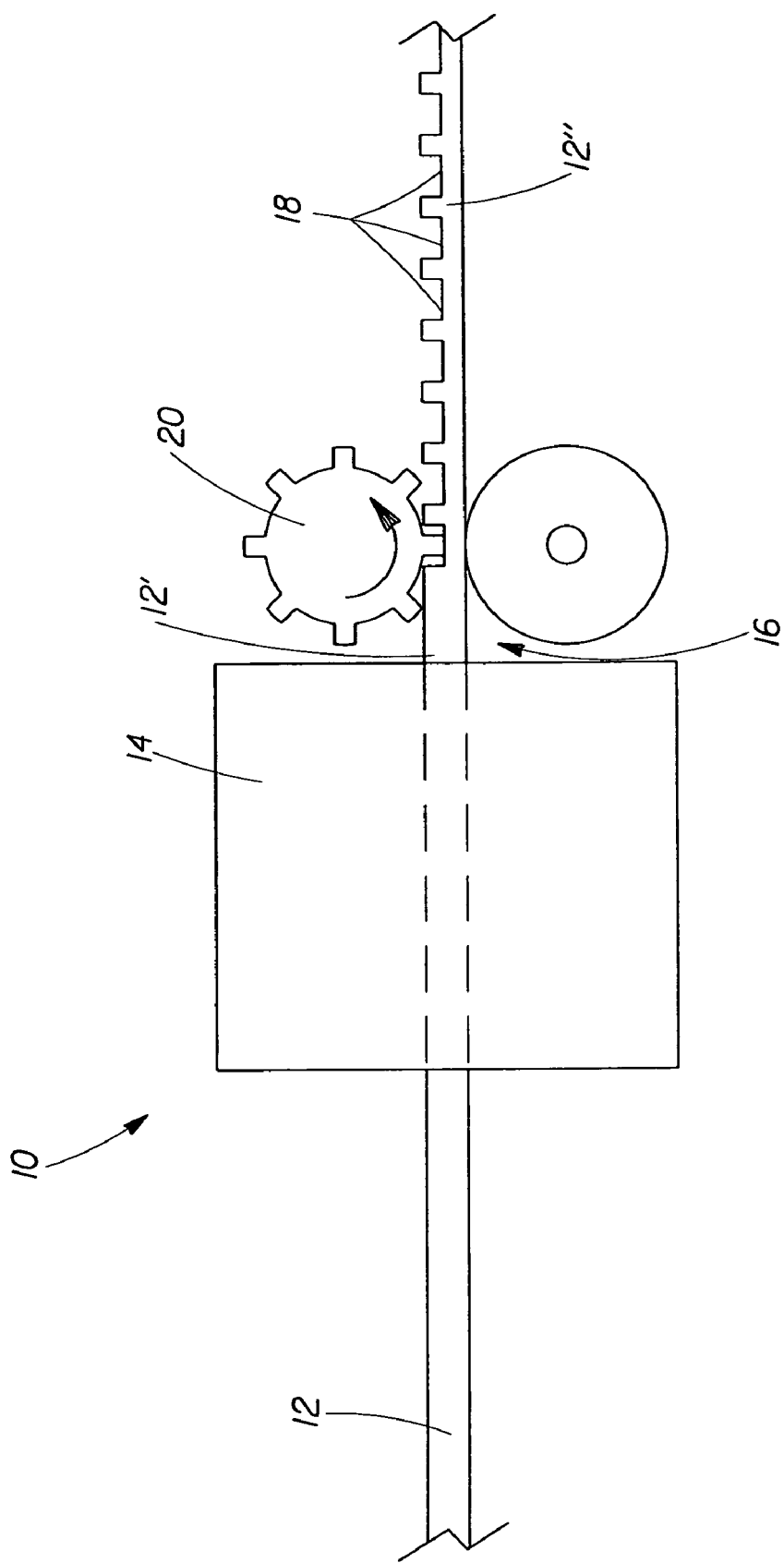
FIG. 1 is a schematic illustration of a method for making a polymeric structure in accordance with the present invention.

"Polymeric structure" as used herein means any physical structure produced by polymer processing the PVOH polymer melt composition of the present invention. Nonlimiting examples of such polymeric structures include fibers, films and foams. Such polymeric structures, especially when in fiber form, may be used, optionally along with other physical structures such as cellulosic fibers and thermoplastic water-insoluble polymer fibers, to form fibrous structures. Preferably the polymeric structure of the present invention as a whole has no melting point or in other words the polymeric structure is a non-thermoplastic polymeric structure. It is also desirable that the polymeric structure of the present invention be substantially homogeneous.

"Fail Stretch" as used herein is defined by the following formula:

$$\frac{\text{Length of Polymeric Structure}_{FL} - \text{Length of Polymeric Structure}_I}{\text{Length of Polymeric Structure}_I} \times 100\%$$

wherein:
Length of Polymeric Structure$_{FL}$ is the length of the polymeric structure at failure load;
Length of Polymeric Structure$_1$ is the initial length of the polymeric structure prior to stretching.

"Peak Stretch" as used herein is defined by the following formula:

$$\frac{\text{Length of Polymeric Structure}_{FL} - \text{Length of Polymeric Structure}_I}{\text{Length of Polymeric Structure}_I} \times 100\%$$

wherein:
Length of Polymeric Structure$_{PL}$ is the length of the polymeric structure at peak load;
Length of Polymeric Structure$_1$ is the initial length of the polymeric structure prior to stretching.

The Strength of the Polymeric Structure is determined by measuring a polymeric structure's Total Dry Tensile Strength (both MD and CD) or "TDT". TDT or Stretch is measured by providing one (1) inch by five (5) inch (2.5 cm×12.7 cm) strips of polymeric structure and/or fibrous product comprising such polymeric structure in need of testing. Each strip is placed on an electronic tensile tester Model 1122 commercially available from Instron Corp., Canton, Mass. The crosshead speed of the tensile tester is 2.0 inches per minute (about 5.1 cm/minute) and the gauge length is 1.0 inch (about 2.54 cm). The tensile tester calculates the stretch at Peak Load and the stretch at Failure Load. Basically, the tensile tester calculates the stretches via the formulae described above. The Stretch at Peak Load, as used herein, is the average of the Stretch at Peak Load for MD and CD. The Stretch at Failure Load, as used herein, is the average of the Stretch at Failure Load for MD and CD.

"Machine direction" (or MD) is the direction parallel to the flow of the polymeric structure being made through the manufacturing equipment.

"Cross machine direction" (or CD) is the direction perpendicular to the machine direction and parallel to the general plane of the polymeric structure.

"Fiber" as used herein means a slender, thin, and highly flexible object having a major axis which is very long, compared to the fiber's two mutually-orthogonal axes that are perpendicular to the major axis. Preferably, an aspect ratio of the major's axis length to an equivalent diameter of the fiber's cross-section perpendicular to the major axis is greater than 100/1, more specifically greater than 500/1, and still more specifically greater than 1000/1, and even more specifically, greater than 5000/1.

The fibers of the present invention may be continuous or substantially continuous. A fiber is continuous if it extends 100% of the MD length of the fibrous structure and/or fibrous product made therefrom. In one embodiment, a fiber is substantially continuous if it extends greater than about 30% and/or greater than about 50% and/or greater than about 70% of the MD length of the fibrous structure and/or fibrous product made therefrom.

The fiber can have a fiber diameter as determined by the Fiber Diameter Test Method described herein of less than about 50 microns and/or less than about 20 microns and/or less than about 10 microns and/or less than about 8 microns and/or less than about 6 microns.

The polymeric structures of the present invention, especially fibers of the present invention, may be produced by crosslinking hydroxyl polymers together. In one embodiment, the polymeric structure, especially in fiber form, formed as a result of the crosslinking, as a whole, exhibits no melting point. In other words, it degrades before melting. Nonlimiting examples of a suitable crosslinking system for achieving crosslinking comprises a crosslinking agent and optionally a crosslinking facilitator, wherein the hydroxyl polymer is crosslinked by the crosslinking agent.

The fibers comprising a hydroxyl polymer may include melt spun fibers, dry spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

In another embodiment, the fibers comprising a hydroxyl polymer may include a multiconstituent fiber, such as a multicomponent fiber, comprising a hydroxyl polymer of the present invention along with a thermoplastic, water-insoluble polymer. A multicomponent fiber, as used herein, means a fiber having more than one separate part in spatial relationship to one another. Multicomponent fibers include bicomponent fibers, which are defined as fibers having two separate parts in a spatial relationship to one another. The different components of multicomponent fibers can be arranged in substantially distinct regions across the cross-section of the fiber and extend continuously along the length of the fiber.

A nonlimiting example of such a multicomponent fiber, specifically a bicomponent fiber, is a bicomponent fiber in which the hydroxyl polymer represents the core of the fiber and the thermoplastic, water-insoluble polymer represents the sheath, which surrounds or substantially surrounds the core of the fiber. The polymer melt composition from which such a fiber is derived preferably includes the hydroxyl polymer and the thermoplastic, water-insoluble polymer.

In another multicomponent, especially bicomponent, fiber embodiment, the sheath may comprise a hydroxyl polymer and a crosslinking system having a crosslinking agent, and the core may comprise a hydroxyl polymer and a crosslinking system having a crosslinking agent. With respect to the sheath and core, the hydroxyl polymer may be the same or different and the crosslinking agent may be the same or different.

Further, the level of hydroxyl polymer may be the same or different and the level of crosslinking agent may be the same or different.

One or more substantially continuous or continuous fibers of the present invention may be incorporated into a fibrous structure, such as a web. Such a fibrous structure may ultimately be incorporated into a commercial product, such as a single- or multi-ply fibrous product, such as facial tissue, bath tissue, paper towels and/or wipes, feminine care products, diapers, writing papers, cores, such as tissue cores, and other types of paper products.

"Ply" or "Plies" as used herein means a single fibrous structure optionally to be disposed in a substantially contiguous, face-to-face relationship with other plies, forming a multi-ply fibrous product. It is also contemplated that a single fibrous structure can effectively form two "plies" or multiple "plies", for example, by being folded on itself Ply or plies can also exist as films or other polymeric structures.

"Basis Weight" as used herein is the weight per unit area of a sample reported in lbs/3000 ft$^2$ or g/m$^2$.

Basis weight is measured by preparing one or more samples of a certain area (m$^2$) and weighing the sample(s) of a fibrous structure and/or film according to the present invention on a top loading balance with a minimum resolution of 0.01 g. The balance is protected from air drafts and other disturbances using a draft shield. Weights are recorded when the readings on the balance become constant. The average weight (g) is calculated and the average area of the samples (m$^2$). The basis weight (g/m$^2$) is calculated by dividing the average weight (g) by the average area of the samples (m$^2$).

"Caliper" as used herein means the macroscopic thickness of a fibrous structure, fibrous product or film. Caliper of a fibrous structure, fibrous product or film according to the present invention is determined by cutting a sample of the fibrous structure, fibrous product or film such that it is larger in size than a load foot loading surface where the load foot loading surface has a circular surface area of about 3.14 in$^2$. The sample is confined between a horizontal flat surface and the load foot loading surface. The load foot loading surface applies a confining pressure to the sample of 15.5 g/cm$^2$ (about 0.21 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in millimeters. In one embodiment of the present invention, the fibrous structure exhibits an average caliper that is less than its bulk caliper "Apparent Density" or "Density" as used herein means the basis weight of a sample divided by the caliper with appropriate conversions incorporated therein. Apparent density used herein has the units g/cm$^3$.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Plasticity" as used herein means at least that a polymeric structure and/or fibrous structure exhibits a capability of being shaped, molded and/or formed.

"Fibrous product" as used includes but is not limited to a wiping implement for post-urinary and post-bowel movement cleaning (toilet tissue), for otorhinolaryngological discharges (facial tissue), and multi-functional absorbent and cleaning uses (absorbent towels).

"Lint" and/or "Pills" as used herein means discrete pieces of a polymeric structure, especially a fibrous structure and/or fibrous product that become separated from the original polymeric structure and/or fibrous structure and/or fibrous product typically during use.

Traditional toilet tissue and toweling are comprised essentially of short cellulose fibers. During the wiping process—both wet and dry, these short fibers can detach from the structure and become evident as lint or pills. The present invention employs essentially continuous fibers vs. traditional discrete, short cellulose fibers. Generally speaking, fibrous structures of the present invention resist linting vs. their cellulose cousins due to the continuous nature of the fibers. Furthermore, fibrous structures of the present invention will resist pilling vs. their cellulose cousins provided the bonding and fiber strength and stretch are sufficient enough to prevent free fiber breakage and entanglement with adjacent fibers during the wiping process.

"Intensive Properties" and/or "Values of Common Intensive Properties" as used herein means density, basis weight, caliper, substrate thickness, elevation, opacity, crepe frequency, and any combination thereof. The fibrous structures of the present invention may comprise two or more regions that exhibit different values of common intensive properties relative to each other. In other words, a fibrous structure of the present invention may comprise one region having a first opacity value and a second region having a second opacity value different from the first opacity value. Such regions may be continuous, substantially continuous and/or discontinuous.

"Dry spinning" and/or "Solvent spinning" as used herein means that polymeric structures are not spun into a coagulating bath, unlike wet spinning.

"Associated" as used herein with respect to fibers means that two or more discrete fibers are in close proximity to one another at one or more positions along the fiber lengths, but less than their entire lengths such that one fiber influences the actions of the other fiber. Nonlimiting examples of means for associating fibers include bonding together (adhesively and/or chemically and/or electrostatically) and/or fusing together such that at the point of association one fiber unit is formed.

"Non-associated" as used herein with respect to fibers means that the fibers are not associated as defined herein.

Methods of the Present Invention

The methods of the present invention relate to producing polymeric structures such as fibers, films or foam from a PVOH polymer melt composition comprising a hydroxyl polymer comprising at least a PVOH hydroxyl polymer and/or to producing fibrous structures comprising a polymeric structure in fiber form.

In one nonlimiting embodiment of a method in accordance with the present invention, as described below, a PVOH polymer melt composition is polymer processed to form a fiber. The fiber can then be incorporated into a fibrous structure.

Any suitable process known to those skilled in the art can be used to produce the polymer melt composition and/or to polymer process the polymer melt composition and/or to produce the polymeric structure of the present invention. Nonlimiting examples of such processes are described in published applications: EP 1 035 239, EP 1 132 427, EP 1 217 106, EP 1 217 107, WO 03/066942 and U.S. Pat. No. 5,342, 225.

A. PVOH Polymer Melt Composition

"PVOH polymer melt composition" as used herein means a composition that comprises a melt processed hydroxyl polymer comprising at least a melt processed PVOH hydroxyl polymer. "Melt processed hydroxyl polymer" as used herein means any polymer that contains greater than 10% and/or greater than 20% and/or greater than 25% by weight hydroxyl groups and that has been melt processed, with or without the aid of an external plasticizer and/or with or without the presence of a pH adjusting agent. More generally, melt processed hydroxyl polymers include polymers, which by the influence of elevated temperatures, pressure and/or external plasticizers may be softened to such a degree that they can be brought into a flowable state (all melt processing operations/processes), and in this condition may be shaped as desired.

The PVOH polymer melt composition may be a composite containing a blend of different polymers, wherein at least one is a melt processed hydroxyl polymer according to the present invention, and/or fillers both inorganic and organic, and/or fibers and/or foaming agents. In one embodiment, the PVOH polymer melt composition comprises two or more different melt processed hydroxyl polymers according to the present invention. As used herein, "different melt processed hydroxyl polymers" includes without limitation, melt processed hydroxyl polymers that contain at least one different moiety relative to another melt processed hydroxyl polymer and/or melt processed hydroxyl polymers that are members of different chemical classes (e.g., PVOH versus starch versus chitosan).

The PVOH polymer melt composition may already be formed or a melt processing step may need to be performed to convert a raw material hydroxyl polymer into a melt processed hydroxyl polymer, thus producing the PVOH polymer melt composition. Any suitable melt processing step known in the art may be used to convert the raw material hydroxyl polymer into the melt processed hydroxyl polymer.

The PVOH polymer melt composition may comprise a) from about 30% and/or 40% and/or 45% and/or 50% to about 75% and/or 80% and/or 85% and/or 90% and/or 99.5% by weight of the PVOH polymer melt composition of a hydroxyl polymer comprising at least a PVOH hydroxyl polymer; b) a crosslinking system comprising from about 0.1% to about 10% by weight of the PVOH polymer melt composition of a crosslinking agent; and c) from about 0% and/or 10% and/or 15% and/or 20% to about 50% and/or 55% and/or 60% and/or 70% by weight of the PVOH polymer melt composition of an external plasticizer (e.g., water).

B. Polymer Processing

"Polymer processing" as used herein means any operation and/or process by which a polymeric structure comprising a processed hydroxyl polymer is formed from a PVOH polymer melt composition. Nonlimiting examples of polymer processing operations include extrusion, molding and/or fiber spinning. Extrusion and molding (either casting or blown), typically produce films, sheets and various profile extrusions. Molding may include injection molding, blown molding and/or compression molding. Fiber spinning may include spun bonding, melt blowing, continuous fiber producing and/or tow fiber producing.

A "processed hydroxyl polymer" as used herein means any hydroxyl polymer that has undergone a melt processing operation and a subsequent polymer processing operation.

C. Polymeric Structure

The PVOH polymer melt composition can be subjected to one or more polymer processing operations such that the PVOH polymer melt composition is processed into a polymeric structure such as a fiber, film or foam comprising the hydroxyl polymer and a crosslinking system according to the present invention.

Post Treatment of Polymeric Structures

Once the PVOH polymer melt composition has been processed into a polymeric structure, such as a fiber, a film, a foam, or a plurality of fibers that together form a fibrous structure, the structure may be subjected to post-treatment curing and/or differential densification.

Curing of the structure may occur before and/or after densifying a region of the structure. Preferably curing occurs before densifying a region of the structure.

In one embodiment, the structure produced via a polymer processing operation may be cured at a curing temperature of from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes prior to densifying a region of the structure. Alternative curing methods may include radiation methods such as UV, e-beam, IR and other temperature-raising methods.

Further, the structure may also be cured at room temperature for days, either after curing at above room temperature or instead of curing at above room temperature.

The structure prior to being densified may comprise non-associated substantially continuous or continuous fibers comprising a hydroxyl polymer. Further, the substantially continuous or continuous fibers may comprise crosslinked hydroxyl polymers. Even further yet, the structure may comprise from about 10% and/or from about 15% and/or from about 20% to about 60% and/or to about 50% and/or to about 40% by weight of the structure of moisture.

Before differential densification, the structure may be in the form of a non-associated structure, especially if the structure comprises one or more fibers. The structure in such non-differential densified form is inferior in intensive properties, especially tensile (stretch), than its wood-based cellulosic fibrous structure cousins.

Accordingly, the structure of the present invention may be subjected to differential densification via a differentially densifying operation. Such differential densification can occur on-line in a continuous process that includes forming the structure and then differentially densifying the structure. Alternatively, the differential densification can occur off-line in a non-continuous process.

Any differentially densifying process known to those of ordinary skill in the art may be used to differentially densify the structures of the present invention.

As a result of differential densification, the structure comprises two or more regions that exhibit different densities as compared to the other.

In one embodiment, the differentially densifying process comprises the step of imparting plasticity into a structure in need of differential densification such that regions of different density can be created in the structure. In other words, the differentially densifying process comprises the step of imparting plasticity into a structure in need of differential densification such that a pattern can be created in the structure. The pattern is designed to impart regions of different densities in the structure. Exposing the structure in need of differential densification to a humid environment, such as from about 20% to about 95% and/or from about 40% to about 90% and/or from about 50% to about 85% and/or from about 65% to about 80% relative humidity for a sufficient time, such as at least 1 second and/or at least 3 seconds and/or at least 5 seconds, can impart sufficient plasticity to the structure to permit differential densification to be created in the structure.

In one embodiment, the differentially densifying process comprises subjecting the structure to a patterned roller such that the pattern on the roller is imparted to the structure, thus causing the structure to become differentially densified.

In another embodiment, the differentially densifying process comprises contacting the structure, which is in contact with a patterned belt/fabric with pressure from a smooth roller thus imparting the pattern of the belt/fabric to the structure causing the structure to become differentially densified.

The differentially densifying of a structure in accordance with the present invention preferably occurs after the structure has been formed, not concurrent with the formation of the structure.

The structure of the present invention may be differentially densified more than once. For example, a structure may be differentially densified, then cured, and then differentially densified again according to the present invention.

In another embodiment, the structure may comprise two or more "plies" of structure which can then be differentially densified as a multi-ply structure.

The structure may be differentially densified, then differential densified again and then cured.

Alternatively, the structure of the present invention may be cured, then differentially densified according to the present invention Curing of the structure, in accordance with the present invention, may occur at any point in time relative to any differentially densifying process. It may occur before (preferably immediately before), after (preferably immediately after), before and after (preferably immediately before and immediately after), or not at all.

The differentially densifying process may occur once or a plurality of times.

Ultrasonics may also be used to aid in differential densification of the structure, especially in conjunction with a patterned roller. The ultrasonics may be generated by any suitable ultrasonic device. For example, a horn or ultrasonic wave generator that is capable of imparting energy to the structure such that the structure deforms according to the pattern on the patterned roller can be used.

In still another embodiment, the step of differentially densifying comprises contacting the fibrous structure with a structure-imparting element comprising a pattern in the presence of humidity and applying a force to the fibrous structure and/or structure-imparting element such that the fibrous structure takes the shape of the pattern on the structure-imparting element to form a differential densified polymeric structure.

In yet still another embodiment, step of differentially densifying the fibrous structure comprises sandwiching the fibrous structure between two belts in the presence of humidity, wherein at least one of the belts is a structured belt comprising a pattern and applying a force to at least one of the belts such that the fibrous structure takes the shape of the pattern on the structured belt to form a differential densified polymeric structure.

A nonlimiting example of a differential densification process for differentially densifying a structure in accordance with the present invention is provided below.

DIFFERENTIAL DENSIFICATION EXAMPLE

A PVOH polymer melt composition containing approximately 40% water is extruded from a twin screw extruder. Crosslinker and other additives are introduced into the PVOH polymer melt composition and mixed via in-line static mixers. The PVOH polymer melt composition with additives is then pumped to a meltblown style spinnerette where fibers are extruded and attenuated into fine fibers. Crosslinkers and additives used are urea glyoxal adduct ("UGA"), ammonium sulfate, and acrylic latex. Total additives are typically 10% or less on a wt % basis of dry hydroxyl polymer. The attenuated fibers are dried with entrained hot air and deposited on a collector belt. The collector belt is typically set at 22-25" from the end of the spinnerette and the structure, a fibrous structure, formed on the collector belts is a non-associated fibrous structure.

FIG. 1 schematically illustrates one embodiment of a differential densification operation 10. After forming, the non-associated fibrous structure 12 is subjected to an environmentally controlled humid environment, such as in a humidity chamber 14. Typical relative humidity range is 70-78%. As the fibrous structure 12 is conveyed through the chamber 14, the fine starch fibers are plasticized, allowing differential densification to be possible. Upon exiting the chamber 14, the plasticized fibrous structure 12' is passed through a patterned nip 16 to associate regions of the fibrous structure, thus producing an associated fibrous structure 12". The associated fibrous structure regions 18 correspond to the pattern utilized on either the carrier belt (not shown) or the roller itself 20. One patterned belt employed has been a square weave open mesh belt, available from Albany International Inc and known as style "Filtratech 10". Nip pressure varies depending on the pattern employed, but is typically in the 200-300 pli range. The fibers present in the fibrous structure are now associated and the fibrous structure exhibits excellent handling properties. After a curing period for the crosslinking system and additives to react, the associated fibrous structure exhibits dry and wet properties acceptable for disposable fibrous products and can be used as a variety of disposable implements, especially toilet tissue or toweling.

Hydroxyl Polymers

Hydroxyl polymers in accordance with the present invention include any hydroxyl-containing polymer that can be incorporated into a polymeric structure of the present invention, preferably in the form of a fiber.

In one embodiment, the hydroxyl polymer of the present invention includes greater than 10% and/or greater than 20% and/or greater than 25% by weight hydroxyl moieties.

Nonlimiting examples of hydroxyl polymers in accordance with the present invention include polyols, such as polyvinyl alcohol, polyvinyl alcohol derivatives, starch, starch derivatives, chitosan, chitosan derivatives, cellulose derivatives such as cellulose ether and ester derivatives, gums, arabinans, galactans, proteins and various other polysaccharides and mixtures thereof.

The hydroxyl polymer preferably has a weight average molecular weight of from about 10,000 to about 40,000,000 g/mol. Higher and lower molecular weight hydroxyl polymers may be used in combination with hydroxyl polymers having the preferred weight average molecular weight.

Well known modifications of natural starches include chemical modifications and/or enzymatic modifications. For example, the natural starch can be acid-thinned, hydroxyethylated or hydroxy-propylated or oxidized.

"Polysaccharides" herein means natural polysaccharides and polysaccharide derivatives or modified polysaccharides. Suitable polysaccharides include, but are not limited to, gums, arabinans, galactans and mixtures thereof.

Crosslinking System

The crosslinking system of the present invention may further comprise, in addition to the crosslinking agent, a crosslinking facilitator.

"Crosslinking facilitator" as used herein means any material that is capable of activating a crosslinking agent thereby transforming the crosslinking agent from its unactivated state to its activated state. In other words, when a crosslinking agent is in its unactivated state, the hydroxyl polymer present in the PVOH polymer melt composition does not undergo premature crosslinking ("unacceptable" crosslinking) as determined according to the Shear Viscosity Change Test Method described herein.

When a crosslinking agent in accordance with the present invention is in its activated state, the hydroxyl polymer present in the polymeric structure may, and preferably does, undergo acceptable crosslinking via the crosslinking agent as determined according to the Initial Total Wet Tensile Test Method described herein.

The crosslinking facilitator may include derivatives of the material that may exist after the transformation/activation of the crosslinking agent. For example, a crosslinking facilitator salt being chemically changed to its acid form and vice versa.

A crosslinking system may be present in the PVOH polymer melt composition and/or may be added to the PVOH polymer melt composition before polymer processing of the PVOH polymer melt composition.

Nonlimiting examples of suitable crosslinking facilitators include acids having a pKa of between about 0 and about 6 and/or between about 1.5 and about 6 and/or between about 2 and about 6 or salts thereof. The crosslinking facilitators may be Bronsted Acids and/or salts thereof, preferably ammonium salts thereof.

In addition, metal salts, such as magnesium and zinc salts, can be used alone or in combination with Bronsted Acids and/or salts thereof, as crosslinking facilitators.

Nonlimiting examples of suitable crosslinking facilitators include acetic acid, benzoic acid, citric acid, formic acid, glycolic acid, lactic acid, maleic acid, phthalic acid, phosphoric acid, sulfuric acid, succinic acid and mixtures thereof and/or their salts, preferably their ammonium salts, such as ammonium glycolate, ammonium citrate and ammonium sulfate.

Nonlimiting examples of suitable crosslinking agents include polycarboxylic acids, imidazolidinones and other compounds resulting from alkyl substituted or unsubstituted cyclic adducts of glyoxal with ureas, thioureas, guanidines, methylene diamides, and methylene dicarbamates and derivatives thereof; and mixtures thereof.

Test Methods

All tests described herein including those described under the Definitions section and the following test methods are conducted on samples that have been conditioned in a conditioned room at a temperature of 73° F.±4° F. (about 23° C.±2.2° C.) and a relative humidity of 50%±10% for 24 hours prior to the test. Further, all tests are conducted in such conditioned room. Tested samples and felts should be subjected to 73° F.±4° F. (about 23° C.±2.2° C.) and a relative humidity of 50%±10% for 24 hours prior to capturing images.

A. Lint/Pilling Test Method i. Sample Preparation

Prior to the testing, fibrous product samples, 4.5"×16" strips of fibrous product, are conditioned according to Tappi Method #T4020M-88.

Each fibrous product sample (6 samples if testing both sides, 3 samples if testing a single side) is first prepared by removing and discarding any pieces of the sample which might have been abraded in handling. For fibrous products formed from multiple plies of fibrous structure, this test can be used to make a lint measurement on the multi-ply fibrous product, or, if the plies can be separated without damaging the fibrous product, a measurement can be taken on the individual plies making up the fibrous product. If a given sample differs from surface to surface, it is necessary to test both surfaces and average the scores in order to arrive at a composite lint score. In some cases, fibrous products are made from multiple-plies of fibrous structures such that the facing-out surfaces are identical, in which case it is only necessary to test one surface.

Each sample is folded upon itself to make a 4.5" CD×4" MD sample. For two-surface testing, make up 3 (4.5" CD×4" MD) samples with a first surface "out" and 3 (4.5" CD×4" MD) samples with the second surface "out". Keep track of which samples are first surface "out" and which are second surface "out".

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.5"×6". Puncture two holes into each of the six pieces of cardboard by forcing the cardboard onto the hold down pins of the Sutherland Rub tester.

Center and carefully place each of the cardboard pieces on top of the six (two surface testing) or three (single surface testing) previously folded samples. Make sure the 6" dimension of the cardboard is running parallel to the machine direction (MD) of each of the samples.

Fold one edge of the exposed portion of the sample onto the back of the cardboard. Secure this edge to the cardboard with adhesive tape obtained from 3M Inc. (¾" wide Scotch Brand, St. Paul, Minn.). Carefully grasp the other over-hanging tissue edge and snugly fold it over onto the back of the cardboard. While maintaining a snug fit of the sample onto the cardboard, tape this second edge to the back of the cardboard. Repeat this procedure for each sample.

Turn over each sample and tape the cross direction edges of the sample to the cardboard for the dry lint/pilling test. One half of the adhesive tape should contact the sample while the other half is adhering to the cardboard. Repeat this procedure for each of the samples. If the sample breaks, tears, or becomes frayed at any time during the course of this sample preparation procedure, discard and make up a new sample with a sample strip.

For the wet lint/pilling test, tape the leading cross direction edge of the sample to the cardboard and a table top upon which the sample is placed. Position the sample on the cardboard such that the trailing edge of the sample is approximately ¼" from the cardboard edge. The leading edge of the sample is taped to the cardboard and table top such that the opposite (trailing) edge of the cardboard is positioned at the edge of the table top.

There will now be 3 first surface "out" samples on cardboard and (optionally) 3 second surface "out" samples on cardboard.

ii. Felt Preparation

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.25"×7.25". Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the felt/cardboard combination to fit tightly around the weight of the Sutherland Rub tester. Draw an arrow running parallel to the long dimension of the cardboard on this scored side of the cardboard.

Cut six pieces of a black felt (F-55 or equivalent from New England Gasket, 550 Broad Street, Bristol, Conn. 06010) to the dimensions of 2.25"×8.5"×0.0625". Place the felt on top of the unscored, green side of the cardboard such that the long edges of both the felt and cardboard are parallel and in alignment. Also allow about 0.5" of the black felt to overhang the top and bottom most edges of the cardboard. Snugly fold over both overhanging felt edges onto the backside of the cardboard with Scotch brand tape, alternatively, the felt can be snugly fit to the cardboard when attaching the felt/cardboard combination to the weight, discussed below. Prepare a total of six of these felt/cardboard combinations.

For the wet lint/pilling test, the felt/cardboard combination includes a 9" strip of Scotch brand tape (0.75" wide) that is placed along each edge of the felt (parallel to the long side of the felt) on the felt side that will be contacting the sample. The untapped felt between the two tape strips has a width between 18-21 mm. Three marks are placed on one of the strips of tape at 0, 4 and 8 centimeters from the trailing back edge of the felt.

All samples must be run with the same lot of felt.

iii. Felt/Cardboard/Weight Component

The felt/cardboard combination is associated with a weight. The weight may include a clamping device to attach the felt/cardboard combination to the weight. The weight and any clamping device totals five (5) pounds. The weight is available from Danilee Company, San Antonio, Tex. The weight has an effective contact area of 25.81 cm$^2$ (4 in$^2$) and provides a contact pressure of about 1.25 psi.

iv. Conducting Dry Lint/Pills Test

The amount of dry lint and/or dry pills generated from a fibrous product according to the present invention is determined with a Sutherland Rub Tester (available from Danilee Company, San Antonio, Tex.). This tester uses a motor to rub a felt/cardboard/weight component 5 times (back and forth) over the fibrous product, while the fibrous product is restrained in a stationary position. The gray value of the felt is measured before and after the rub test. The difference between these two gray values is then used to calculate a dry lint score and/or a dry pill score.

The Sutherland Rub Tester must first be calibrated prior to use. First, turn on the Sutherland Rub Tester pressing the "reset" button. Set the tester to run 5 strokes at the lower of the two speeds. One stroke is a single and complete forward and reverse motion of the weight. The end of the rubbing block should be in the position closest to the operator at the beginning and at the end of each test.

Prepare a calibration sample on cardboard as described above. In addition, prepare a calibration felt on cardboard as described above. Both of these calibration articles will be used for calibration of the instrument and will not be used in the acquisition of data for the actual samples.

Place the calibration sample/cardboard combination on the base plate of the tester by slipping the holes in the board over the hold-down pins. The hold-down pins prevent the sample from moving during the test. Clip the calibration felt/cardboard combination onto the weight component described above with the cardboard side contacting the pads of the weight. Make sure the calibration felt/cardboard combination is resting flat against the weight. Hook this weight onto the tester arm of the Sutherland Rub Tester gently placing it on top of the calibration sample/cardboard combination. The calibration felt must rest level on the calibration sample and must be in 100% contact with the calibration sample surface. Activate the Sutherland Rub Tester by pressing the "start" button.

Keep a count of the number of strokes and observe and make a mental note of the starting and stopping position of the calibration felt covered weight in relationship to the calibration sample. If the total number of strokes is five and if the position of the calibration felt covered weight is the same at the end as it was in the beginning of the test, the tester is calibrated and ready to use. If the total number of strokes is not five or if the start and end positions of the calibration felt covered weight are different, then instrument may require servicing and/or recalibration. During the actual testing of samples, monitor and observe the stroke count and the starting and ending points of the felt covered weight.

v. Conducting Wet Lint/Pills Test

Wet lint/pills are determined by pulling, during one pass, a wetted felt/cardboard/weight component over a sample.

To wet the felt, pipet 0.6 ml of deionized water onto the felt, distributing the water as evenly as possible between the 4 and 8 cm marks as represented on the tape attached to the felt. Wait 10 seconds and then place the felt/cardboard/weight component on the center of the sample. After 1 second, pull the felt/cardboard/weight component by the leading edge horizontally until the felt/cardboard/weight component is completely off the table. Pull the weight in a manner to avoid placing any additional force on the felt/cardboard/weight component other than the horizontal pull force. The process of pulling the felt/cardboard/weight component takes about 0.5 to 1.5 seconds. The pulling process should occur as a substantially continuous or continuous motion.

Carefully remove the felt/cardboard combination from the felt/cardboard/weight component and allow to dry before capturing the image. Then complete image analysis operations and calculations on the felt and/or sample as described below.

vi. Image Capture

Figure 2:
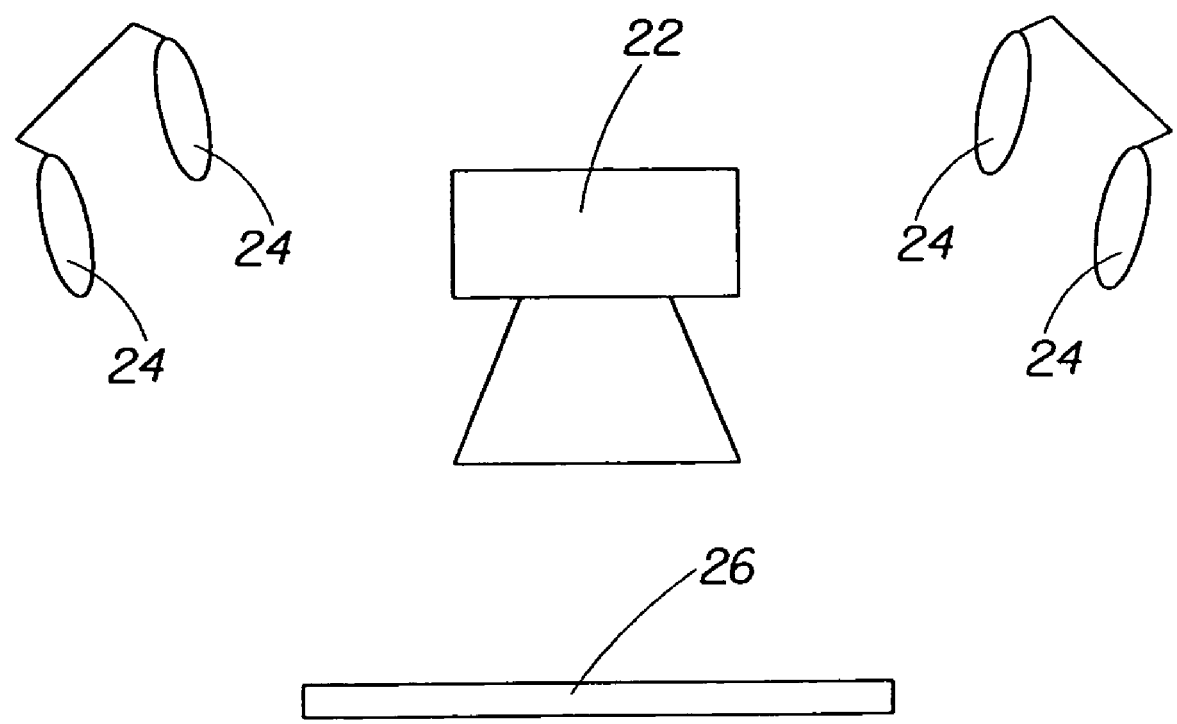
FIG. 2 is a schematic illustration of a camera set-up suitable for use in the Lint/Pilling Test Method described herein.

The images of the felt (untested), sample (untested) and felt (tested) are captured using a Nikon Digital Camera (DIX) with a Nikon Nikkor 24-85 mm f2.8-f4 D 1F AF lens (set to 85 mm maximum zoom) and Nikon Capture software installed on an appropriate computer. As schematically illustrated in FIG. 2, the camera 22 attached to a Kodak camera stand/lighting set-up (not shown) having four incandescent lamps 24 (Polaroid MP-4 Land Camera model 44-22, 120 volt 150 watts each) that are directed at the felt 26 positioned 31 cm (12.2 inches) under the lens of the mounted camera. The individual incandescent lamps 24 are positioned 27.94 cm (11 inches) apart. Each pair of incandescent lamps 24 are positioned 88.9 cm (35 inches) apart. The incandescent lamps 24 are positioned 56.83 cm (22⅜ inches) above the felt 26. The camera is connected via an appropriate cable to the computer. The camera should be turned on in PC mode. Turn the button to macro on the camera lens and flip the switch to the orange mark on the lens base. Adjust zoom to its maximum level of 85 mm. Turn the auto focus feature off. The Nikon Capture software needs to be in operating order to capture images. The settings for the Nikon Capture software are as follows: Exposure 1—manual exposure mode, 1/30 second shutter speed, f/6.3 aperture and 0EV exposure compensation; Exposure 2—center weighted meter mode, ISO 125 sensitivity and incandescent white balance; Storage Settings—raw (12 bit) data format, no compression, color image type and large (3008×1960) image size; Mechanical—single shooting mode, single area AF area mode, manual focus mode. A calibration felt/cardboard combination is placed under the camera such that the felt is centered under the lens of the camera. Manually focus the camera on the felt. Take an image. The exposure difference needs to be in the range of .+2.5 to +2.75. Save the image as a TIFF file (RGB) 8-bit. This image is used to perform the lint and pilling calculations in the Image Analysis Software (Optimas 6.5). Additional images of the sample/cardboard combination (untested) and the felt/cardboard combination (tested) need to be captured in the same manner. Also, an image of a known length standard (e.g., a ruler) is taken (exposure difference does not matter for this image).

vii. Image Analysis

The images captured are analyzed using Optimas 6.5 Image Analysis software commercially available from Media Cybernetics, L.P. Imaging set-up parameters, as listed herein, must be strictly adhered to in order to have meaningfully comparative lint score and pill score results.

First, an image with a known length standard (e.g., a ruler) is brought up in Optimas, and used to calibrate length units (millimeters in this case).

For dry testing, the tested felt image has a region of interest (ROI area) of approximately 4510 mm$^2$ (82 mm by 55 mm). The exact ROI area is measured and recorded (variable name: ROI area).

For wet lint/pills testing, the tested felt image has 2 regions of interest (ROI areas):

1) the "wetted" region (between the 4-8 cm marks on the tape) and 2) the "dragged" region (between the 0-4 cm marks on the tape). Each ROI area is approximately 608 mm$^2$ (38 mm×16 mm). The exact ROI area is measured and recorded (variable name: ROI area).

An image of an untested black felt is opened, and the average gray value (using the same ROI of the untested felt as the tested felt) is measured and recorded (variable name: untested felt Gray Value avg).

The tested sample luminance is saturated white (gray value=255) and constant for samples of interest. If believed to be different, measure the tested sample in a similar fashion as was done for the untested felt, and record (variable name: untested sample Gray Value avg).

The luminance threshold is calculated as the numerical average of the untested felt Gray Value avg and untested sample Gray Value avg.

The tested felt image is opened, and the ROI is created and properly positioned such that the ROI surrounds the region of the tested felt image to be analyzed. The average luminance for the ROI is recorded (variable name: ROI Gray Value avg).

Pills are determined as follows: Optimas creates boundary lines in the image where pixel luminance values cross through the threshold value (e.g., if the threshold a Gray Value of 155, boundary lines are created where pixels of higher and lower value exist on either side. The criteria for determining a pill is that it must have an average luminance greater than the threshold value, and have a perimeter length greater than 2 mm for dry pills, and 0.5 mm for wet pills. The pill areas present in the ROI are summed (variable name: Total Pilled Area).

viii. Calculations

The data obtained from the image analysis is used in the following calculations:

Pilled Area %=Total Pilled Area/ROI area

Avg. Pill Size (Area Weighted Avg., mm$^2$)=Σ(Pilled Areas)$^2$/Total Pilled Area Lint Score=unpilled felt Gray Value avg−untested felt Gray Value avg where: unpilled felt Gray Value avg=[(ROI Gray Value avg*ROI area)−(pilled Gray Value avg*pilled area)]/Total Unpilled Area Total Area Lint & Pill Score=ROI Gray Value avg−untested felt Gray Value avg By taking the average of the lint score on the first-side surface and the second-side surface, the lint is obtained which is applicable to that particular web or product. In other words, to calculate lint score, the following formula is used:

$$\text{Dry Lint Score} = \frac{\text{Dry Lint Score, 1}^{st} \text{ side} + \text{Dry Lint Score, 2}^{nd} \text{ side}}{2}$$

$$\text{Dry Pill Area \%} = \frac{\text{Dry Pill Area \%, 1}^{st} \text{ side} + \text{Dry Pill Area \%, 2}^{nd} \text{ side}}{2}$$

$$\text{Wet Lint Score} = \frac{[(\text{Wetted Area Lint Score} + \text{Dragged Area Lint Score})1^{st} \text{ side} + (\text{Wetted Area Lint Score} + \text{Dragged Area Lint Score})2^{nd} \text{ side}]}{2}$$

$$\text{Wet Pill Area \%} = \frac{[(\text{Wetted Area Pill Area \%} + \text{Dragged Area Pill Area \%})1^{st} \text{ side} + (\text{Wetted Area Pill Area \%} + \text{Dragged Area Pill Area \%})2^{nd} \text{ side}]}{2}$$

The fibrous structure and/or fibrous product of the present invention may exhibit a wet lint score of less than about 25 and/or a wet pill area of less than about 4% and/or a dry lint score of less than about 50 and/or a dry lint pill area of less than about 5%.

B. Shear Viscosity of a Polymer Melt Composition Measurement Test Method

The shear viscosity of a polymer melt composition of the present invention is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the polymer melt composition is loaded into the barrel section of the rheometer. Rid the sample of any entrapped air. Push the sample from the barrel through the capillary die at a set of chosen rates 1,000-10,000 seconds$^{-1}$. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta=K\gamma^{n-1}$, wherein K is the material's viscosity constant, n is the material's thinning index and $\gamma$ is the shear rate. The reported apparent shear viscosity of the composition herein is calculated from an interpolation to a shear rate of 3,000 sec$^{-1}$ using the power law relation.

C. Shear Viscosity Change Test Method

Viscosities of three samples of a single polymer melt composition of the present invention comprising a crosslinking system to be tested are measured by filling three separate 60 cc syringes; the shear viscosity of one sample is measured immediately (initial shear viscosity) (it takes about 10 minutes from the time the sample is placed in the rheometer to get the first reading) according to the Shear Viscosity of a Polymer Melt Composition Measurement Test Method. If the initial shear viscosity of the first sample is not within the range of 5-8 Pascal-Seconds as measured at a shear rate of 3,000 sec$^{-1}$, then the single polymer melt composition has to be adjusted such that the single polymer melt composition's initial shear viscosity is within the range of 5-8 Pascal-Seconds as measured at a shear rate of 3,000 sec$^{-1}$ and this Shear Viscosity Change Test Method is then repeated. Once the initial shear viscosity of the polymer melt composition is within the range of 5-8 Pascal-Seconds as measured at a shear rate of 3,000 sec-1, then the other two samples are measured by the same test method after being stored in a convection oven at 80° C. for 70 and 130 minutes, respectively. The shear viscosity at 3000 sec$^{-1}$ for the 70 and 130 minute samples is divided by the initial shear viscosity to obtain a normalized shear viscosity change for the 70 and 130 minute samples. If the normalized shear viscosity change is 1.3 times or greater after 70 minutes and/or is 2 times or greater after 130 minutes, then the crosslinking system within the polymer melt composition is unacceptable, and thus is not within the scope of the present invention. However, if the normalized shear viscosity change is less than 1.3 times after 70 minutes and/or (preferably and) is less than 2 times after 130 minutes, then the crosslinking system is not unacceptable, and thus it is within the scope of the present invention with respect to polymer melt compositions comprising the crosslinking system. Preferably, the crosslinking system is acceptable with respect to polymeric structures derived from polymer melt compositions comprising the crosslinking system as determined by the Initial Total Wet Tensile Test Method.

Preferably, the normalized shear viscosity changes will be less than 1.2 times after 70 minutes and/or less than 1.7 times after 130 minutes; more preferably less than 1.1 times after 70 minutes and/or less than 1.4 times after 130 minutes.

D. Initial Total Wet Tensile Test Method

An electronic tensile tester (Thwing-Albert EJA Materials Tester, Thwing-Albert Instrument Co., 10960 Dutton Rd., Philadelphia, Pa., 19154) is used and operated at a crosshead speed of 4.0 inch (about 10.16 cm) per minute and a gauge length of 1.0 inch (about 2.54 cm), using a strip of a polymeric structure of 1 inch wide and a length greater than 3 inches long. The two ends of the strip are placed in the upper jaws of the machine, and the center of the strip is placed around a stainless steel peg (0.5 cm in diameter). After verifying that the strip is bent evenly around the steel peg, the strip is soaked in distilled water at about 20° C. for a soak time of 5 seconds before initiating cross-head movement. The initial result of the test is an array of data in the form load (grams force) versus crosshead displacement (centimeters from starting point).

The sample is tested in two orientations, referred to here as MD (machine direction, i.e., in the same direction as the continuously wound reel and forming fabric) and CD (cross-machine direction, i.e., 90° from MD). The MD and CD wet tensile strengths are determined using the above equipment and calculations in the following manner:

Initial Total Wet Tensile=$ITWT$ (g/inch)=Peak Load$_{MD}$(g$_f$)/2 (inch$_{width}$)+Peak Load$_{CD}$ (g$_f$)/2 (inch$_{width}$)

The Initial Total Wet Tensile value is then normalized for the basis weight of the strip from which it was tested. The normalized basis weight used is 36 g/m$^2$, and is calculated as follows:

Normalized $\{ITWT\}=\{ITWT\}*36$ (g/m$^2$)/Basis Weight of Strip (g/m$^2$)

If the initial total wet tensile of a polymeric structure, especially a fibrous structure and/or fibrous product comprising a polymeric structure comprising a crosslinking system of the present invention is at least 3 g/2.54 cm (3 g/in) and/or at least 4 g/2.54 cm (4 g/in) and/or at least 5 g/2.54 cm (5 g/in), then the crosslinking system is acceptable and is, along with its corresponding polymeric structure and/or fibrous structure and/or fibrous product, within the scope of the present invention.

E. Fiber Diameter Test Method

A polymeric structure comprising fibers of appropriate basis weight (approximately 5 to 20 grams/square meter) is cut into a rectangular shape, approximately 20 mm by 35 mm. The sample is then coated using a SEM sputter coater (EMS Inc, PA, USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 µm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.3) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeletonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

All documents cited in the Detailed Description of the Invention are, in relevant part, incorporated herein by reference; the citation of any document is not to be considered as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for making a fibrous structure, the method comprising the steps of:
   a. providing a polymer melt composition comprising a PVOH, a hydroxyl polymer starch and a crosslinking agent comprising an imidazolidinone; and
   b. polymer processing the polymer melt composition such that the imidazolidinone crosslinks the hydroxyl polymer starch to form a plurality of fibers;
   c. collecting the plurality of fibers to form a fibrous structure;
   d. curing the fibers; and
   e. fusing two or more fibers together at one or more positions along the fiber lengths such that at the point of fusing one fiber unit is formed.

2. The method according to claim 1 wherein the method further comprises the step of differentially densifying the fibrous structure such that two or more regions exhibit different densities relative to each other.

3. The method according to claim 2 wherein the step of differentially densifying comprises contacting the fibrous structure with a structure-imparting element comprising a pattern in the presence of humidity such that the fibrous structure takes the shape of the pattern on the structure-imparting element.

4. The method according to claim 2 wherein the step of differentially densifying the fibrous structure comprises sandwiching the fibrous structure between two belts in the presence of humidity, wherein at least one of the belts is a structured belt comprising a pattern such that the fibrous structure takes the shape of the pattern on the structured belt.

5. The method according to claim 1 wherein the polymer processing step comprises dry spinning the polymer melt composition.

6. The method according to claim 1 wherein the method further comprises the step of adding cellulose fibers in combination with the plurality of fibers to make the fibrous structure.

* * * * *